Dec. 7, 1965    T. A. BANNING, JR., ETAL    3,222,680
DEFLECTABLE BEAM SCANNING UNITS, AND THE LIKE
Original Filed May 4, 1954    8 Sheets-Sheet 1
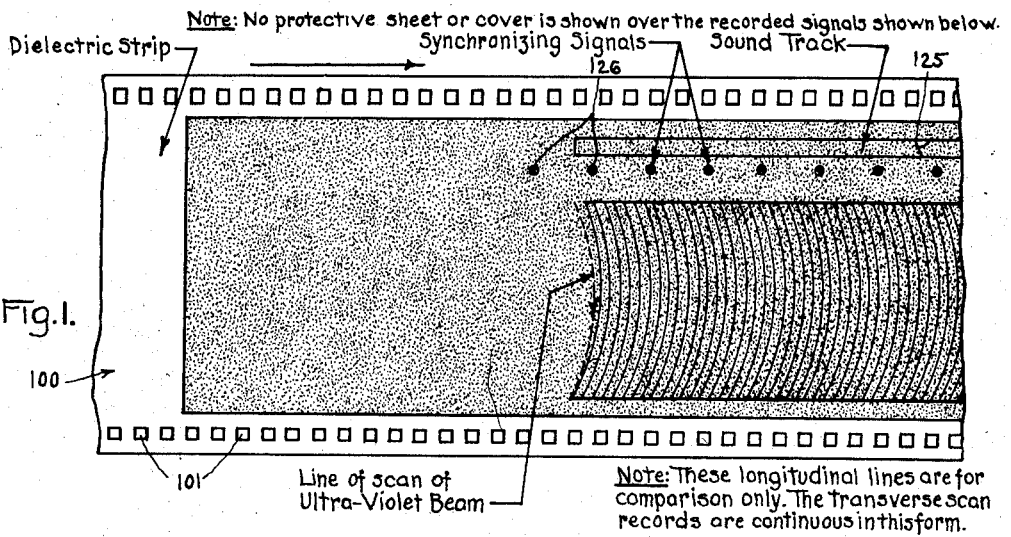
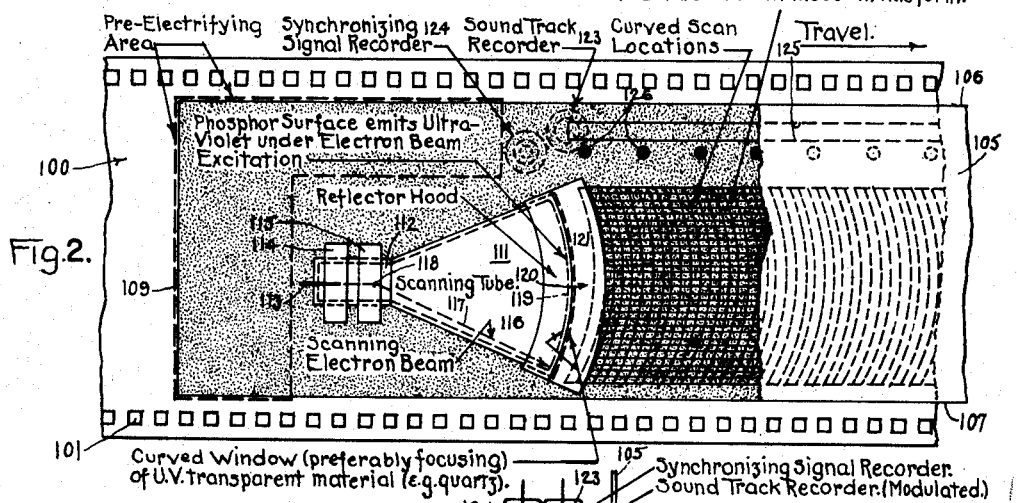
Inventors:
Thomas A. Banning, Jr. and Agnes J. Ranseen, Executrix of
the Estate of Emil L. Ranseen, deceased,
by Thos. A. Banning Jr.
Atty.

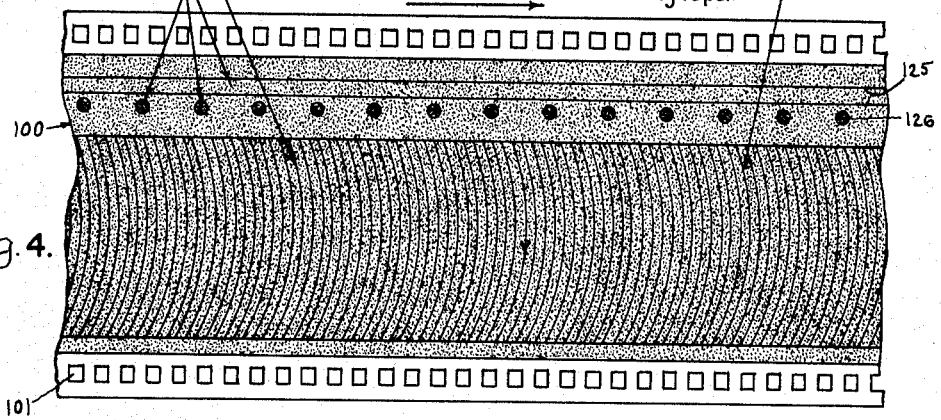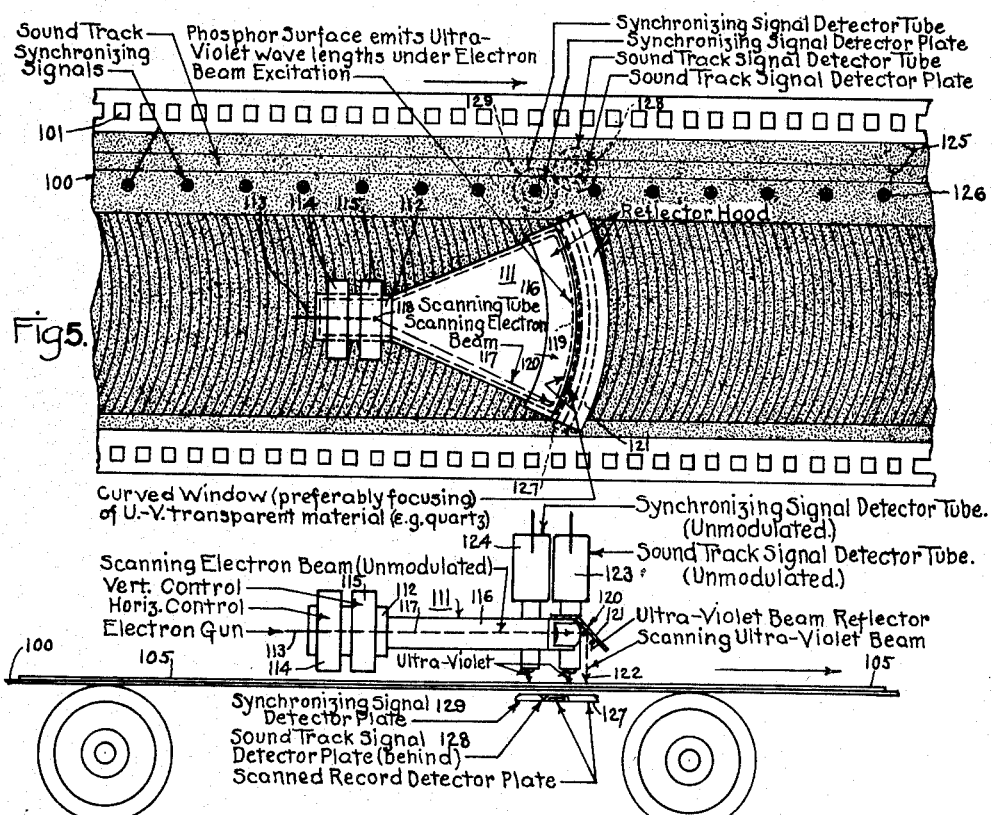

Dec. 7, 1965  T. A. BANNING, JR., ETAL  3,222,680
DEFLECTABLE BEAM SCANNING UNITS, AND THE LIKE
Original Filed May 4, 1954  8 Sheets-Sheet 3
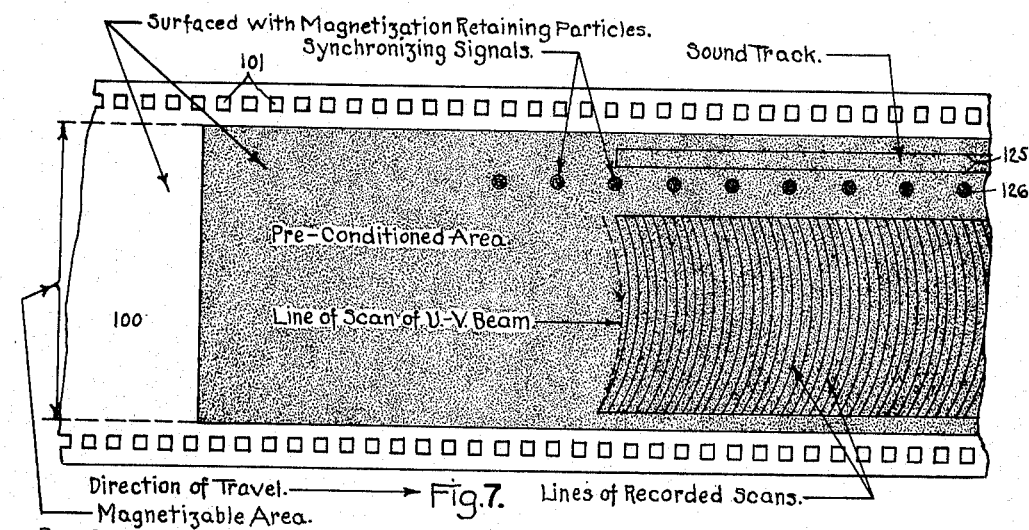
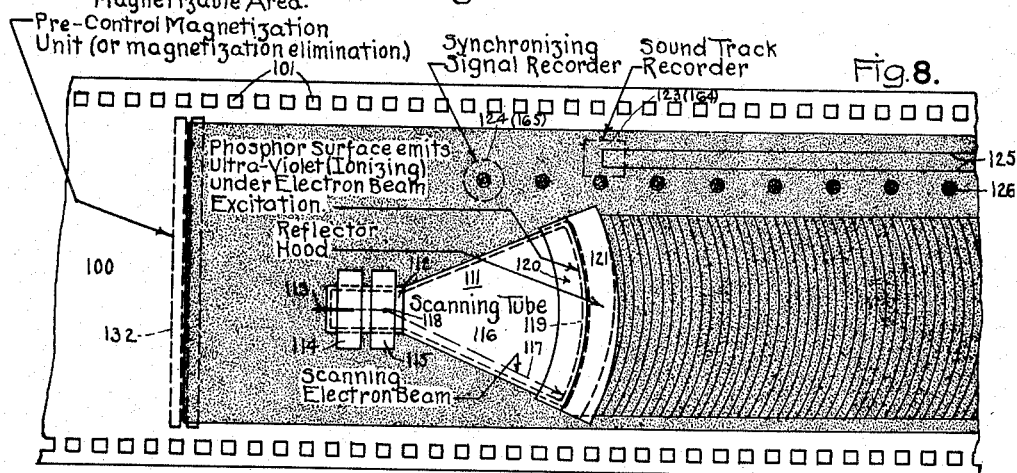
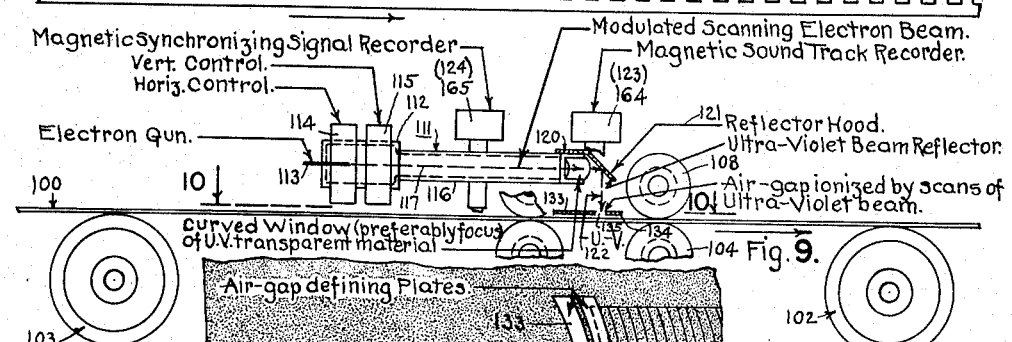
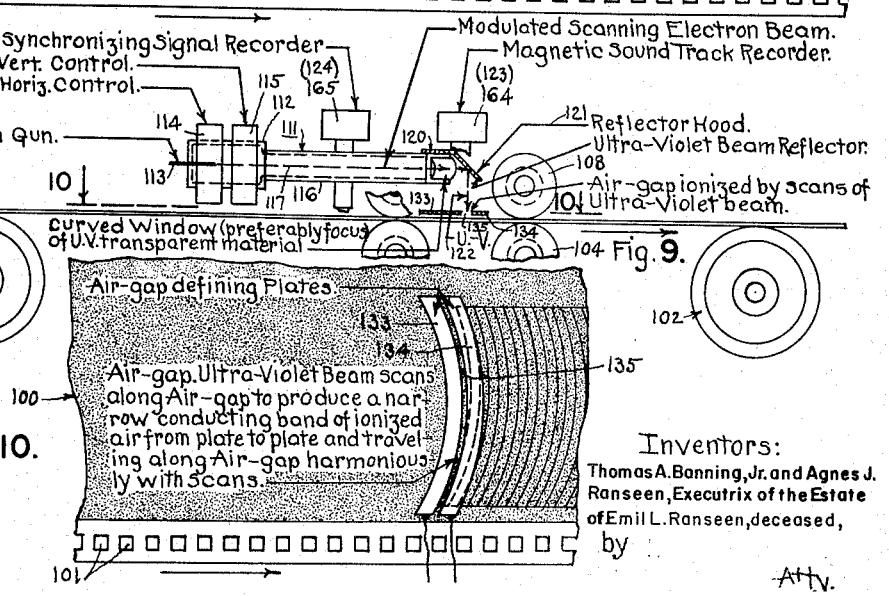
Inventors:
Thomas A. Banning, Jr. and Agnes J.
Ranseen, Executrix of the Estate
of Emil L. Ranseen, deceased,
by
Atty.

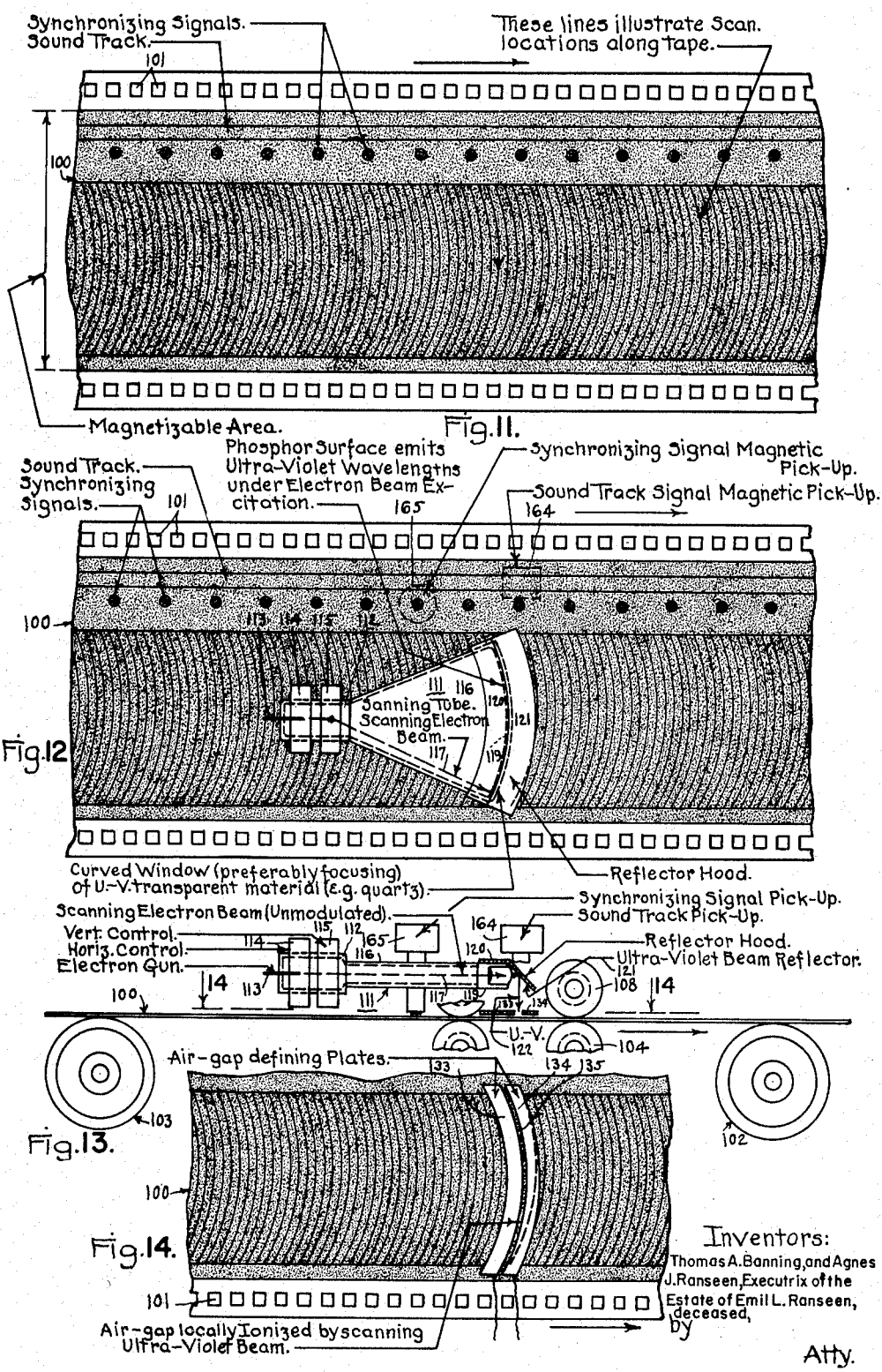

Dec. 7, 1965     T. A. BANNING, JR., ETAL     3,222,680
DEFLECTABLE BEAM SCANNING UNITS, AND THE LIKE
Original Filed May 4, 1954            8 Sheets-Sheet 5
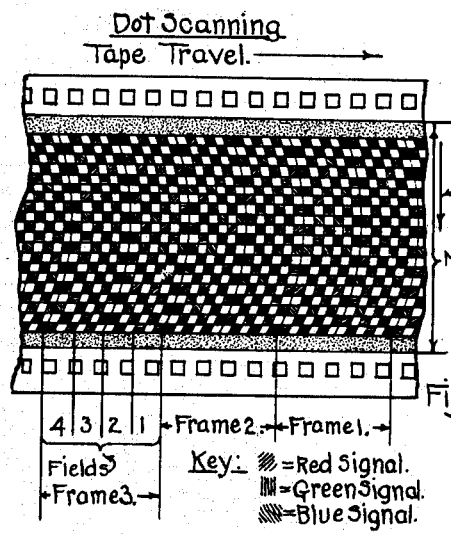
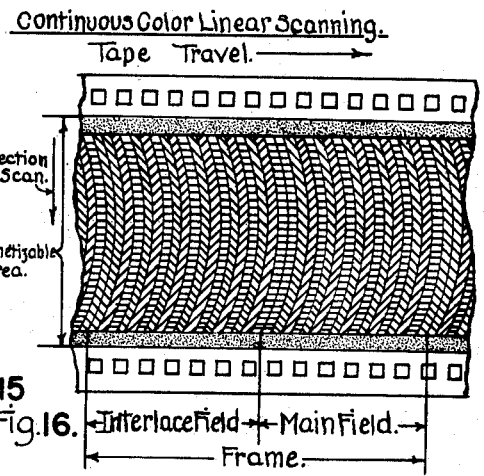
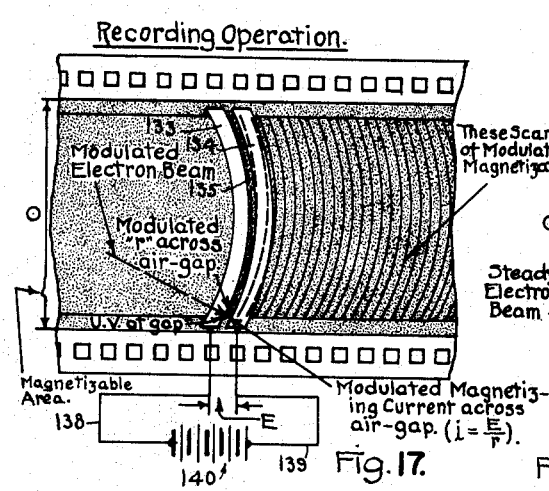
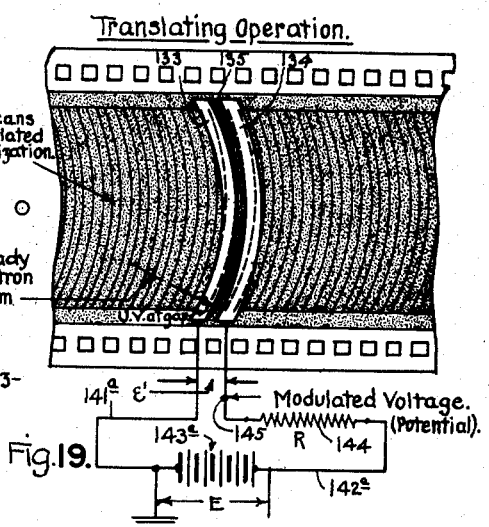
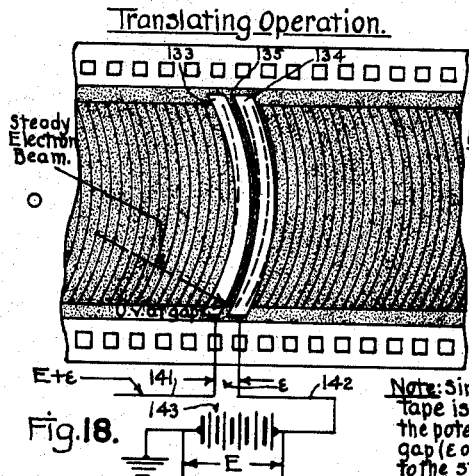
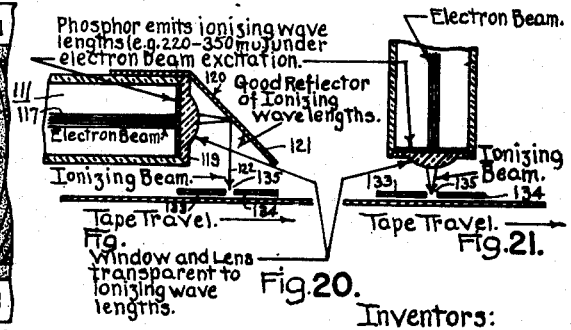
Inventors:
Thomas A. Banning, Jr. and Agnes J. Ranseen, Executrix of the Estate of Emil L. Ranseen, deceased,

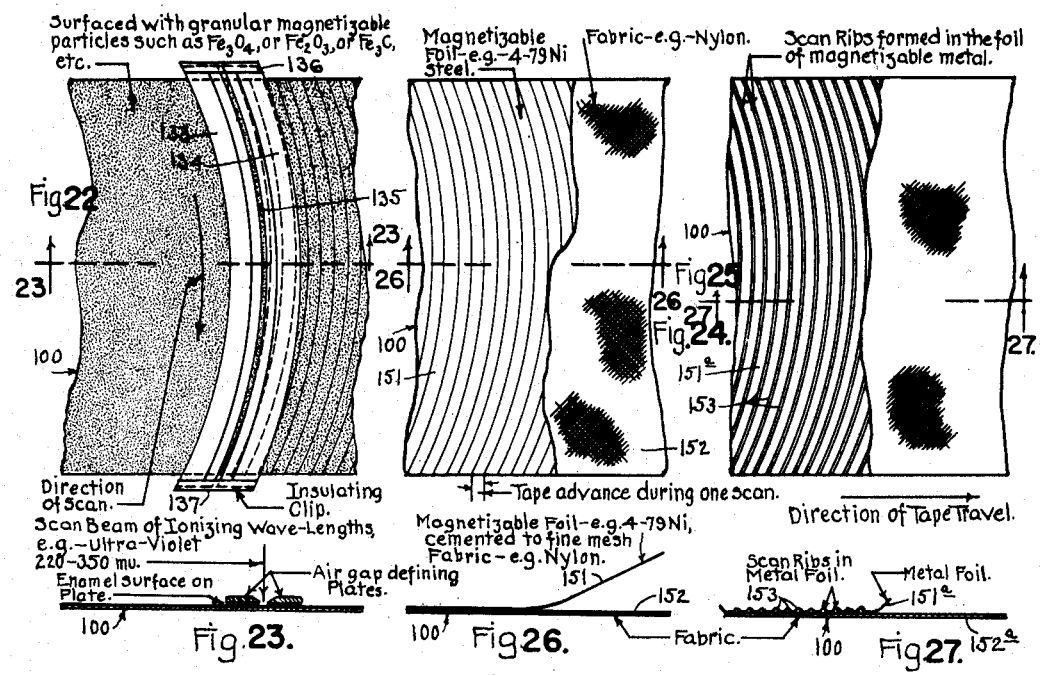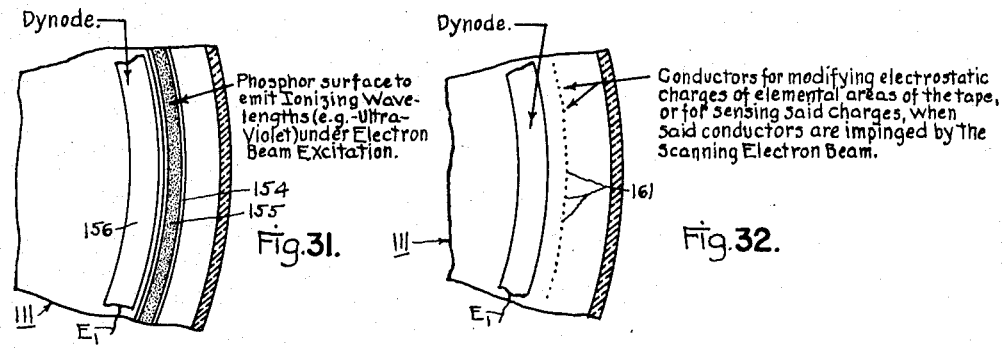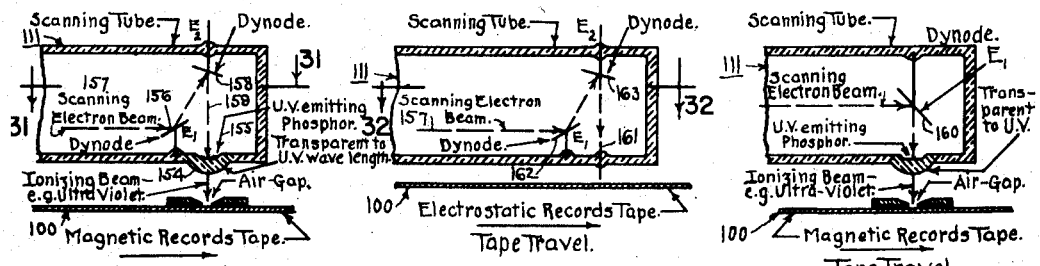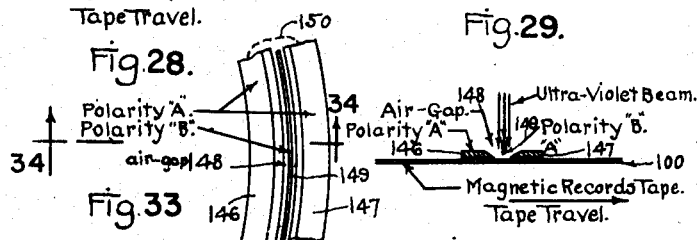

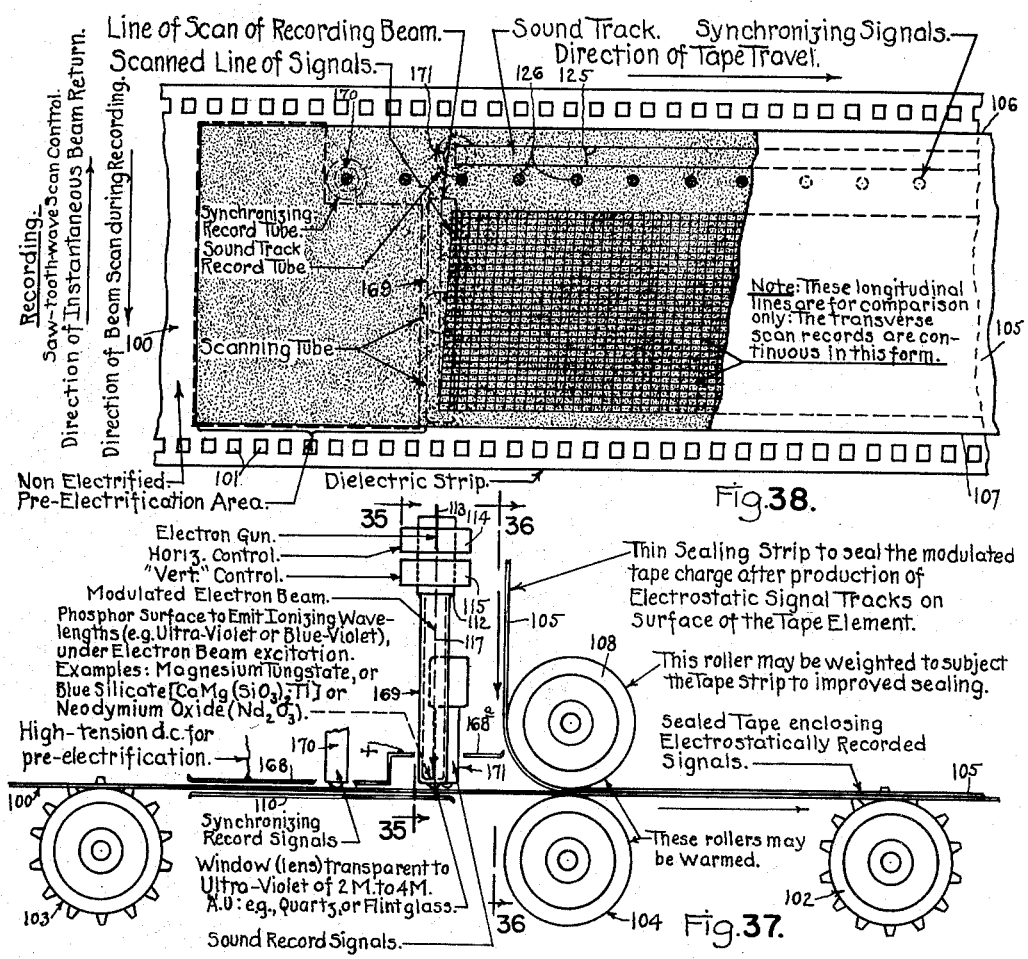

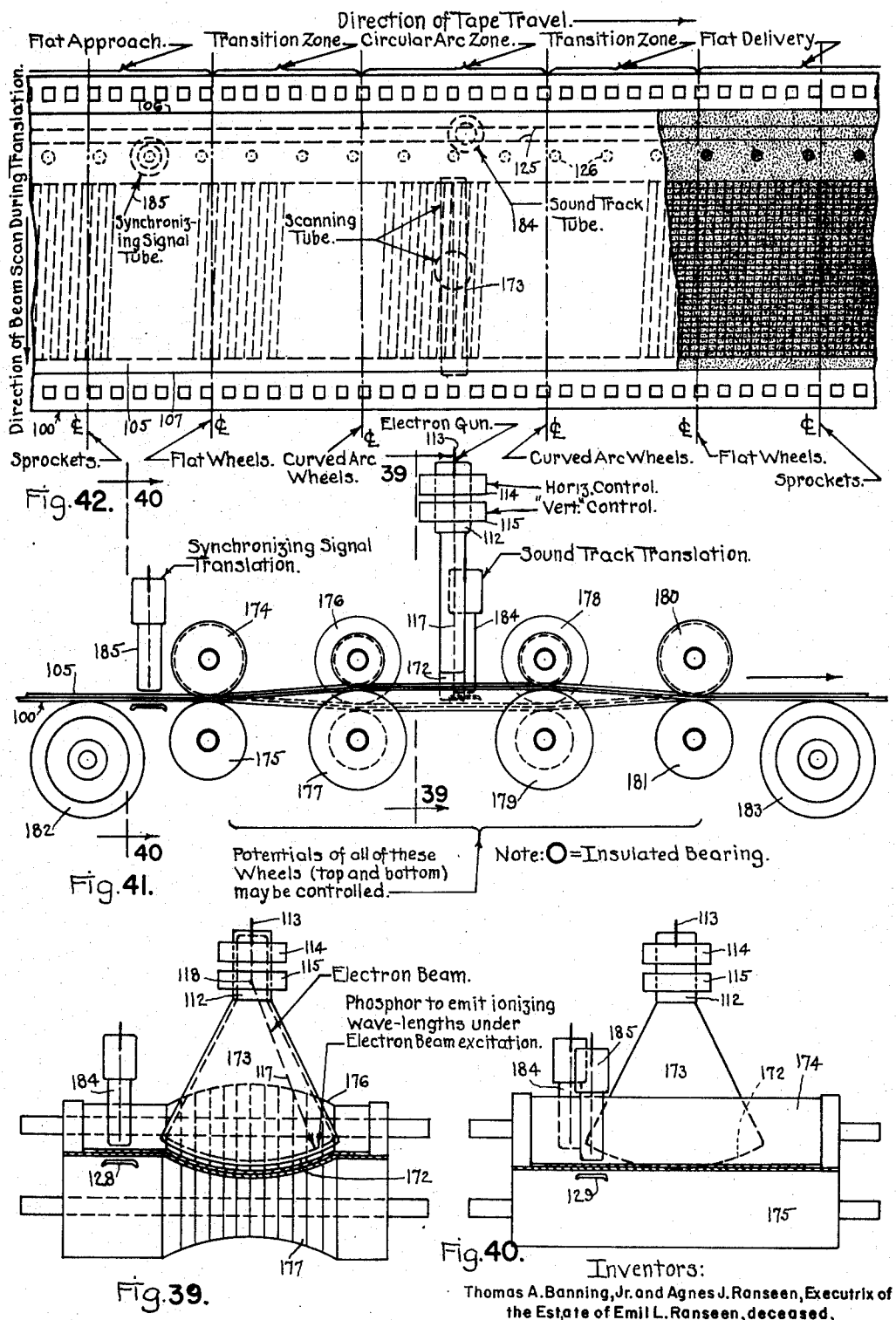

United States Patent Office 3,222,680
Patented Dec. 7, 1965

3,222,680
DEFLECTABLE BEAM SCANNING UNITS, AND
THE LIKE
Thomas A. Banning, Jr., Chicago, Ill., and Emil L. Ranseen, deceased, late of Chicago, Ill., by Agnes J. Ranseen, executrix, Evanston, Ill.; said Agnes J. Ranseen assignor to said Banning
Original application May 4, 1954, Ser. No. 427,428, now Patent No. 2,976,354, dated Mar. 21, 1961. Divided and this application Mar. 9, 1961, Ser. No. 94,650
13 Claims. (Cl. 346—74)

This invention is a division of application Serial No. 427,428, filed May 4, 1954, now Patent No. 2,976,354 issued March 21, 1961 and relates to improvements in deflectable beam scanning units, and the like. More particularly, the invention relates to a deflectable beam scanning unit in which the deflectable beam is susceptible of deflection by magnetic or electrostatic deflection elements or yokes, acting through or in an envelope in which such beam is produced and deflected, together with means constituted to transfer the energy or power effects of such beam through such envelope, to enable use of such energy or power effect to produce desired responses outside of such envelope. By such transfer of the energy or power of the beam during its scanning operations, through the envelope it becomes possible to effect or translate recordings corresponding to the energy or power of the beam at different points along its path of scan to locations outside of the envelope, where recordings or translations may be made and/or recorded.

Specifically, an embodiment of the invention is one in which the beam comprises an electron beam projected by a conventional form of electron gun, with lateral deflection yoke or yokes provided either inside or outside of the envelope wherein the gun and the beam are contained, it being desired to make provision of means to enable effects to be produced outside of the envelope along a path corresponding to the deflected path of the beam within the envelope, and to modulate the strengths of such effects at successive points along the path, to produce effects of strength proportional to the beam strength at each point in the path of beam scan. The electron beam is itself substantially arrested by the material of the envelope, so that under conventional forms of structure or elements the beam itself is isolated within the envelope, although, in the case of provision of proper excitable surfaces upon which the beam impinges, suitable light effects may be provided corresponding to the beam's movements and intensities at successive points; but such light effects are not, of themselves directly usable for various recording and play-back operations.

Under some conditions minute effects may be sensed outside of the conventional electron tube envelope, due to minute transfers of force through the envelope at the location of impingement of the beam; but such effects are of such minute quantity that it has heretofore been extremely difficult or impossible to make recordings corresponding to such effects. It is the prime object of the present invention to provide improvements in deflectable beam scanning tube units, whereby the effect of the beam may be transferred through the tube envelope at each point of the envelope corresponding to the path of beam scan, and with the strengths of the so-transferred effects at all points in the path of scan, proportional to the strengths of the beam at such points. Such effects are produced either or both by producing a beam strength suffiicent to penetrate the tube envelope at each point in the scanned path, or by providing means to produce a secondary beam, produced within the envelope by the primary or electron beam, which secondary beam travels along the path of scan or some pre-determined path, and with the strength of such secondary beam modulated at all times, and at all points of scan of such secondary beam, proportionately to the modulation of the strengths of the primary or electron beam, such secondary beam impinging on a window or area of the envelope which window is transparent to such secondary beam so that such secondary beam is present outside of the envelope at all points in the path of scan, and in strength at each such point, proportional to the strength of the original, electron beam.

Conveniently, the secondary beam, when used, is of wave-lengths lying in the ionizing range, so that objects or air spaces directly impinged or contacted by such secondary beam outside of the envelope, become conducting in proportion to the strength of the ionizing beam at each point of the path. Under these conditions such ionized produced conductivity may be availed of for production or control of current strengths proportional to the instantaneous modulations of the primary (electron) beam as transferred through the effects of the secondary beam.

When the secondary (envelope penetrating) beam is produced by the primary (electron) beam, such primary beam may be caused to impinge on an excitable surface (such as a phosphor) of composition and characteristics which will produce wave-lengths in the ionizing and/or envelope penetrating zone, so that such secondary wave-lengths are thus transmittable through the envelope, to be used outside of the envelope as previously suggested. The window or portion of the envelope which is transparent to such secondary beam may be formed of material which is highly transparent to the produced secondary wave-lengths. Thus a maximum degree of effect may be produced outside of the envelope, with correspondingly beneficial results. It is also true, as hereinafter shown in more detail, that such wave-lengths which are thus transmittable through such window, are also ionizing in character. Thus a double benefit is produced by the transmittion of the wave-lengths in question through the envelope (window).

A further benefiit is produced when provision is included for magnifying or amplifying the beam strength within the envelope. Such amplification is disclosed hereinafter, by use of very simple and inexpensive amplifying means. Conveniently, but not necessarily, such amplifying means may be included in manner to amplify the original or primary beam (the electron beam), thus avoiding the necessity of interposing the amplifying means in the path of the secondary beam, and at a location intermediate between the excitable, secondary beam producing surface, and the window through which such beam shall penetrate.

In order to secure maximum strength benfits for production of the ionizing effects outside of the envelope, with corresponding advantages, provision is also made, preferably, but not necessarily, in the form of the envelope window, of a lens, for bringing the secondary beam to focus outside of the envelope, with focusing produced along the path of secondary beam scan, and in that minute zone of such scan wherein the conductivity is to be modified according to the modulations of the scan strength. Such focusing may be thus produced by forming the envelope window as a lens, properly proportioned to produce the desired result.

When the effect outside of the envelope is to be produced in direction parallel to the length of the envelope, the window may be located in the end of the envelope, for direct emission of the ionizing beam in such direction; when the effect outside of the envelope is to be produced in direction at right-angles (or other angle) with respect to the length of the envelope, reflecting means may be provided within the envelope to direct the beam by reflection or dynode action, in the desired direction to and through the window, or suitable reflecting means may be provided outside of the envelope to reflect the ionizing beam into desired direction. All such embodiments are herein illustrated and will be described.

The beam transmitted through the window may be used to so affect a conductor or conductors that the current flowing through or between conductors subjected to the influence of such outside-delivered beam will be modulated, either as to the magnitude of such current, or by a voltage modulation. In either case the effects thus produced outside of the envelope will correspond, both spatially and in timing, to the deflections of the original electron beam, and will also respond in value to the strength of the electron beam in case such strength is modulated.

Otherwise such so-delivered ionizing beam outside of the envelope may be used to produce electristatic effects by impinging such ionizing beam onto an electro-statically charged body such as a surface, thus partially discharging the electrostatic charge from such surface at each elemental area thereof proportionately to the strength of the ionizing beam which impinges such elemental area, and leaving, thus, a modulated strength of electro-static charge on the surface, translated according to the modulations of strength of the electron beam itself.

When the production of the secondary, ionizing quality beam is produced by exciting a suitable composition and characteristic of phosphor by impingement of the electron beam thereon, such electron beam will execute lateral swings in accordance with lateral deflection controls applied to the tube. Such swings will be back and forth, or will be in only one direction, with momentary extinction of the beam during the return of the control excitation to its starting point and value. Conventionally such swings may be produced by saw-tooth generators of conventional form. When no vertical deflection is produced on the electron beam it is evident that all such lateral swings will produce impingement along one and the same line of the excitable surface. In order to avoid a too rapid deterioration of such excitable surface along such line, provision may be made for slight vertical deflections of the electron beam, that is, slight deflections in direction at right angles to the lateral swing direction, thus distributing the deterioration of such excitable surface, with extension of its useful life.

The following disclosures include provisions for all of the foregoing effects and operations, as well as others.

In the parent application the herein described embodiments of the deflectable beam scanning units have been disclosed, as well as various embodiments of recording and translating means which may use such beam scanning units. Accordingly, there are herein disclosed and included not only the showings and disclosures respecting the beam scanning unit per se, but also, for better understanding of certain of the inventive features of such beam scanning unit, there are included in this case, showings of some of the recording and translating means which may be used in connection with such beam scanning means.

Other objects and uses of the invention will appear from a detailed description of the same, which consists in the features of construction and combinations of parts hereinafter described and claimed.

In the drawings:

FIGURE 1 shows a section of one form of tape on which there has been recorded a series of cross-scans of information, by use of the deflectable beam scanning unit to which the present invention refers; such deflectable beam scanning unit not being shown in FIGURE 1, which figure serves primarily to show the forms and relationships of successive scanned recordings which are produced on the tape by the deflectable beam scanning unit to which this invention refers;

FIGURE 2 shows a view similar to that of FIGURE 1, but it shows one embodiment of the deflectable beam scanning unit in place above the tape; and numerous cross-scanned recordings are shown at the right of such deflectable beam scanning unit, the tape travelling to the right in such figure;

FIGURE 3 shows a front elevation corresponding to FIGURE 2;

FIGURE 4 shows a length of tape which has been provided with the cross-scanned recordings over its entire length, and is ready for the play-back or translating operation;

FIGURE 5 shows a view corresponding to that of FIGURE 4, but with a deflectable beam scanning unit similar to that used during the recording operation, in place above the tape; such deflectable beam unit being used, in FIGURE 5, as a sensing unit instead of a record producing unit;

FIGURE 6 shows a front elevation corresponding to FIGURE 5;

It is noted that in FIGURES 1 to 6, inclusive, the recordings are produced on a tape of dielectric material, by an electro-static recording and subsequent sensing and interpreting operation, and that the deflectable beam scanning unit is usable for producing such electro-statically recorded signals, as well as for producing magnetically recorded signals, and that the use of the deflectable beam scanning for producing such magnetically recorded signals will be shown in further figures of this case; and it is also noted that there are included in FIGURES 1 to 6, inclusive, various legendings to aid in understanding the structures of the deflectable beam unit, as used in such figures;

FIGURE 7 shows a view similar to that of FIGURE 1; but in the present case the recordings by use of the deflectable beam scanning unit are being produced on a magnetizable surface instead of on the surface of a tape of dielectric material; such fact being evidenced by the legendings carried by FIGURE 7;

FIGURE 8 shows a view similar to that of FIGURE 2; but in the present case the recordings are being produced on the magnetizable surface of the tape; and in the present case the deflectable beam scanning unit is provided with means to produce a magnetizing current close to the tape surface, and moving laterally according to the scans of the beam, and controlled by the beam during such scans, both spatially and in strength, to provide for producing the magnetic recordings on the tape surface;

FIGURE 9 shows a front elevation corresponding to FIGURE 8, but with the secondary beam reflector cut away to better reveal the manner of incidence of such secondary beam against such surface and reflection therefrom down into the small air-gap between the conductors, to this ionize such air-gap to an incremental area and close to the magnetizable surface, the path of the beam being shown by the arrows;

FIGURE 10 shows a fragmentary horizontal section taken just above the air-gap producing conductors shown in arcuate form in FIGURE 10, and in section in FIGURE 9;

FIGURES 11, 12 and 13 shows views similar to those of FIGURES 4, 5 and 6, but for the condition of sensing and translating previously recorded, magnetically recorded signals, instead of sensing and translating electro-statically recorded signals on a sheet of dielectric;

FIGURE 14 shows a fragmentary horizontal section taken just above the two air-gap producing conductors, and similar to the showing of FIGURE 10;

FIGURES 7 to 14, inclusive, include various legendings to aid the understanding of the structures and operations of such figures;

FIGURES 15 and 16 show, schematically, the forms of recordings which may be produced on the tape, either electrostatically or magnetically, when recording a color television program, the signals of which are on the "dot" system, FIGURE 15, and on the full color scan system, FIGURE 16; by use of the deflectable beam scanning unit of the present invention;

FIGURE 17, shows, schematically, and in simple form, a circuitry usable in the production of the recorded signals on the magnetic tape; the two air-gap defining conductors being shown as in FIGURES 10 and 14; and in this case the strength of the current flow between the two conductors varies according to the strength of the ionized beam brought to focus between such conductors, and also moves along such air-gap in exact harmony with the deflections of the electron beam;

FIGURE 18 shows, schematically, and in simple form, a circuitry for translating the sensed magnetic recordings, and producing response signals which may be amplified, according to the strengths of the magnetic recordings carried by the tape;

FIGURE 19 shows, schematically, and in simple form, another circuitry for translating the sensed magnetic recordings and producing signals of response which may be amplified, according to the strengths of the magnetic recordings carried by the tape;

FIGURE 20 shows, on enlarged scale, and in section, the end portion of one form of deflectable beam scanning unit, in which the body of such unit lies parallel to the surface of the tape, as in FIGURES 8, 9, 12 and 13, so that the deflectable beam swings in a plane substantially parallel to the tape surface; and this figure also shows a reflector of ultra-violet wave-lengths outside of the envelope and just beyond the window, for reflecting such secondary beam directly down against the surface of the tape; the window being formed into magnifying form constituted to bring the ionizing beam to focus within the air-gap between the two conductors;

FIGURE 21 shows a section similar to that of FIGURE 20; but in the embodiment shown in FIGURE 21 the deflectable beam is deflected within a plane extending substantially at right-angles to the plane of the tape;

FIGURE 22 shows, on enlarged scale as compared to other figures, a section of magnetizable tape, together with the parallel conductors between which is the air-gap at which air-gap the secondary beam is focused; and this figure shows the end clips of insulating material by which such conductors are supported at proper and permanent spacing, such clips being carried by some stationary element such as the end portion of the tube or the reflector which is in turn carried by such tube;

FIGURE 23 shows a cross-section (fragmentary) taken through the showing of FIGURE 22; taken on line 23—23 of FIGURE 22, looking in the direction of the arrows;

FIGURE 24 shows a fragmentary face view of one form of magnetic tape to which the signals may be transferred and recorded; this embodiment of tape including a thin sheet or foil of magnetic material mounted on a thin sheet of backing of high tensile strength; and in this figure a portion of the magnetic sheet has been torn away to reveal the backing sheet;

FIGURE 25 shows a view similar to that of FIGURE 24; but in the embodiment of FIGURE 25 the magnetic material sheet is provided with fine cross-wise extending ridges at equal spacings along the tape, such ridges being of contour corresponding to the form of the cross-scans, and the ridge spacings being the same as the spacings between successive cross-scans produced by the deflectable beam unit;

FIGURE 26 is a fragmentary longitudinal section taken on the line 26—26 of FIGURE 24, looking in the direction of the arrows; and in FIGURE 26 the right-hand portion of the magnetizable sheet is raised from its backing to individualize the two components;

FIGURE 27 is a fragmentary longitudinal section taken on the line 27—27 of FIGURE 25, looking in the direction of the arrows; and in this figure the right-hand portion of the ridged sheet of magnetic material has been torn away;

FIGURE 28 shows a fragmentary vertical section through the window end portion of the envelope of one embodiment of the deflectable beam scanning unit; and in this embodiment the window which is transparent to the ionizing wave-length is formed in the lower wall of the tube envelope and is of lens section to bring the emerging ionizing wave-length beam to focus at the desired plane surface where the central portion of the air-gap is located, to produce a maximum strength of the ionizing effect; and in this embodiment there are provided two diodes located at successive locations in the path of the electron beam, to produce two magnifications of the beam strength by secondary emission of electrons from such diodes; these diodes being so angled and formed that the beam delivered from the second diode is directed directly to the window without need of further reflecting action; the window being formed of material highly transparent to the ionizing wave-lengths;

FIGURE 29 shows another embodiment of a deflectable beam scanning unit in which the window transparent to the ionizing wave-lengths is replaced by a series of fine conductors extending through the material of the envelope, so that such conductors are directly electrified by the electron beam's impact against the ends of such conductors within the envelope; and in this embodiment there are also shown two diodes angled and formed in such manner as to reflect the intensified electron beam directly to the inner ends of such conductors;

FIGURE 30 shows a view similar to that of FIGURE 28; but in the present case only a single diode amplification is provided for intensifying the electron beam, with reflection from such single diode directly to the window which is transparent to the ionizing wave-lengths;

It is noted, as legended in both FIGURES 28 and 30, that the surface of the window, in each of the embodiments shown in said figures, against which the reflected and amplified electron beam impinges, is coated with phosphor which produces ultra-violet wave-lengths (ionizing) under the electron beam excitation; so that the beam transmitted through the window is of corresponding wave-lengths, that is, wave-lengths to which such window is transparent;

FIGURE 31 shows a fragmentary horizontal section taken on the line 31 of FIGURE 28, looking in the direction of the arrows; and this figure shows the curved form of the window and the curved form of the diode shown in such embodiment, such curvature corresponding to the curved path of the beam sweep without change of the beam length from its gun;

FIGURE 32 shows a fragmentary horizontal section taken on the line 32—32 of FIGURE 29, looking in the direction of the arrows; and this figure shows the curved form of the diode shown in such embodiment, and also the curved perimeter which contains the numerous conductors which extend through the envelope in this embodiment;

FIGURE 33 shows a fragmentary horizontal or plan view looking down towards the two conductors which establish the narrow air-gap between them, which air-gap is ionized by the bringing of the ionizing wave-length beam to focus therein; and the embodiment shown in this figure includes a third narrow conductor extending along such air-gap and insulated from the other two conductors, such two conductors being connected together and to one polarity of a circuit, and the intermediate conductor being connected to the other polarity of such circuit;

FIGURE 34 shows a cross-section taken on the line 34—34 of FIGURE 33, looking in the direction of the arrows; and this figure shows how the ionizing wave-length beam straddles such intermediate or third conductor, and ionizes the air-gap at both sides of such third conductor;

FIGURE 35 shows a cross-section taken on the line 35—35 of FIGURE 37, looking in the direction of the arrows; and FIGURE 35 shows an embodiment of the deflectable beam, scanning unit, which is provided with a straight end window, instead of a curved end window such as shown in FIGURES 2, 3, 5, 8, 10, 12 and 13, and elsewhere, the arrangement shown in FIGURE 35 being one in which the beam emerges directly from such straight end window without need of providing a reflector to reflect the electron beam at right-angles as in the previously described embodiments;

FIGURE 36 shows a cross-section taken on the line 36—36 of FIGURE 37, looking in the direction of the arrows;

FIGURE 37 shows a longitudinal side elevation of one embodiment of use of the form of deflectable beam scanning unit shown in FIGURES 35 and 36; and in FIGURE 37 the deflectable beam scanning unit is shown as used for producing a recording electro-statically on a sheet of dielectric, by modulating the strength of the electro-static charge carried by such sheet, by impingement of the ionizing wave-length beam against the charge carried by such dielectric sheet according to the strength of the ionizing wave-length beam emerging from the scanning unit and impinging or affecting the dielectric surface at successive locations of such surface; and in FIGURE 37 there is also shown means to trap the modulated electro-static charge carried by the dielectric sheet after such modulation by covering such dielectric sheet's surface with another thin sheet of dielectric material;

FIGURE 38 shows a horizontal or face view of the sheet of dielectric shown in FIGURES 35, 36 and 37, the deflectable beam scanning unit having been removed from above the dielectric sheet;

FIGURE 39 shows a cross-section taken on the line 39—39 of FIGURE 41, looking in the direction of the arrows; and FIGURE 39 shows an embodiment of the deflectable beam scanning unit, which is provided with a curved end window, instead of a straight end window as in the embodiment of FIGURE 35, it being noted, however, that in both of the embodiments of FIGURES 35 and 39 the ionizing wave-length beam emerges directly from such end windows without need of interposition of the reflecting surface, for impingement against the record carrying surface of the tape; and in FIGURE 39 the curvature of the tube end is concentric with the axis of beam swing during lateral deflections of the beam, so that the focal length of the beam may be the same at all angles of such swing, and still bring the beam to focus at the phosphor surface which is to be excited for production of the ionizing wave-length beam; and it is also noted that in the embodiment of FIGURE 39 the tape is brought into a curved cross-section at its location directly beneath the deflectable beam scanning unit, so that close engagement or influence is produced between the emerging ionizing wave-length beam and the tape surface;

FIGURE 40 shows a cross-section taken on FIGURE 41, line 40—40, looking in the direction of the arrows; and this figure shows the tape in its flat condition prior to being brought into the desired curved cross-section desired at the location of the scanning unit;

FIGURE 41 shows a side elevational view corresponding to FIGURES 39 and 40; and this figure shows a sequence of rollers by which the tape is first brought into curved cross-section during its approach to the scanning unit location, and is afterwards restored to its flat condition; and FIGURE 42 shows a typical horizontal view looking down onto the tape surface of the embodiment of FIGURES 39, 40 and 41, the right-hand portion of the upper or sealing sheet of dielectric having been torn away; and the scanning unit having also been removed from its position above the tape.

The present invention concerns itself broadly, with the provision of an electronic unit wherein the strength of the electronic beam within the envelope of the unit, may be translated to a responsive force outside of the envelope, of strength proportional to the strength of the electron beam within that envelope; and wherein such responsive force outside of that envelope may be of such strength, and may be of such accuracy at all times; as respects its strength, to be both practically usable for production of desired interpretations; and as respects its accuracy, to truly interpret the strength of the electron beam within that envelope.

It has been known that the electrons projected by the gun may penetrate very thin metal foils against which the beam is directed; but only a very small portion of the beam's force within the envelope is thus transmitted to the outside of that envelope. Also, due to the very nature of such an operation, being a mechanical projection of the ultra-small electrons through the material of such foil, changes of direction of the electrons in passing through such foil may and do occur, with corresponding dispersion of the effects produced outside of that envelope. Various other so-far impractical expedients have been proposed for translating the strength (and direction) of the electron beam within the envelope to forces outside of that envelope, but each of these alternate proposed solutions of the problem have been subject to one or more objections of either a technical or a practical nature.

The present invention relates to the provision of means other than direct propagation of the electron beam itself through the wall of the envelope, for producing at the outside of the envelope an effect exactly proportional in strength, to the strength of the electron beam within such envelope, and of direction or location of such effect outside of the envelope, exactly representative of the direction or location of the electron beam within that envelope; such effect outside of the envelope being of a nature which is immediately translatable into a corresponding current usable for a record production; the effect thus produced outside of the envelope being a force effect as distinguished from a visual effect produced in the kinescope, or on the viewing screen of such a device as an oscillograph, wherein the translation of the electron beam effect is to a visual effect at the outside of such envelope.

In one embodiment of the invention provision is made for translation of the electron beam effect into a wave form effect, of wave length such that it may be readily delivered through a window or portion of the envelope, which is transparent to such wave lengths. In this connection, it is also presently shown, that waves of lengths to which the envelopes or portions thereof (windows) are highly transparent, so that such waves may be transmitted directly through such envelope portions (windows), may also be of ionizing quality, so that direct control of electrical effects may be produced by such wave-lengths emerging through and from the envelope portion (window). Furthermore, such wave-lengths to which the envelope portion is highly transparent, are transmittable through such envelope portion (window) under directional control of the effect produced outside of the envelope. Thus, for example, such wave-lengths may be brought to focus at a selected location outside of the envelope, with corresponding amplification of the beam of such wave-lengths at a location outside of the envelope.

Conveniently, the electron beam within the envelope may be directed against a phosphor coating on the window portion of the envelope, which phosphor is of quality to emit wave-lengths within the ionizing range, such as wave-lengths in the ultra-violet range, under excitation of the electron beam. Such ultra-violet wave-lengths are readily transmittable through such materials as quartz or fluorite, and "hard glass". As examples of such phosphors, magnesium tungstate, $MgWO_4$ or blue silicate $((CaMg(SiO_3)_2.Ti))$, or neodymium oxide $(Nd_2O_3)$, may be mentioned. Other phosphors which will produce the desired emission are also well known in the arts. Materials which are transparent to the ionizing wave-lengths have already been mentioned. Many others are suitable.

It is also desirable that lens effects be produced in such window by suitable formation thereof, so that the transmitted ultra-violet beam will be brought to focus outside of the envelope, and for this reason in various figures the window portions 119 are shown as of rounded or lens formation, it being understood that the exact form of such window's section will depend on the light system, and the elements of distance, etc., found in the embodiment. Reference is made to FIGURES 20, 21, 28 and 30, as showing some forms of suggested lens arrangements, but these are schematic showings, only. It is desirable that the window material have not only a high efficiency of transmission of the ultra-violet wave-lengths, but also a rather high index of refractions so that proper lens effects may be produced in convenient window designs. The quartz and fluorite comply with these requirements. Both of these materials have indices of refraction of substantially 1.44 to 1.46, depending on the wave-lengths being transmitted.

Quartz is transparent to ultra-violet radiation down to approximately 185 M$\mu$ with less than 6% absorption in a plate 1 cm. thick, and fluorite is similarly transparent for radiation down to approximately 120 m$\mu$ with a small absorption. Other materials will suggest themselves to the student of this application as suitable for production of the desired window, and also for production of the desired emission of ultra-violet by the impingement of the electron beam on the phosphor coating.

Since the electron beam is brought to focus at the surface or body of the phosphor coating on the inside of the window, it is possible to produce a sharply defined effect; and since there is thus produced a small, sharply defined spot of ultra-violet emission directly adjacent to the inside of the window, and the lens thereof, it is possible to pass this radiation as a sharp beam through to the outside of the envelope. The lens design will also add to the sharpness of the ultra-violet beam delivered to the outside. This beam will travel along the length of the window, being the arcuate width of the envelope end. Various physical embodiments of the structures complying with requirements of the present invention will be described hereinafter.

When the ultra-violet beam outside of the envelope is emitted in a direction other than that desired for production of the translating responses, proper change of direction of such ultra-violet beam may be produced by suitable reflecting surfaces outside of the envelope, and against which the ultra-violet beam is incident as delivered from the window. Such reflector arrangements are shown in FIGURES 1, 2 and 3, and other figures. In FIGURES 1, 2 and 3, such reflector is shown at 120, in the form of an arcuate hood having a horizontal flange set onto the top surface of the envelope, and also having a downwardly extending reflecting flange 121 which is curved around in a horizontal plane to conform to the curvature of the window, and which flange is of form to reflect the reflected beam down directly towards the surface on which a record is to be produced. Such incidence is shown at 122 in FIGURE 3. By proper reflector design, combined with proper consideration of the form of the ultra-violet beam coming through the window, it is possible to ensure that the reflected beam will come nicely to focus at the desired location, being the surface of a tape in the form shown in FIGURE 3. By proper selection of the reflecting surface material a high efficiency of reflection of the ultra-violet wave-lengths may be secured. Thus, coatings of silver, copper, gold, steel, nickel, platinum, and others are high reflectors of the wave-lengths in question. Attention is called especially to the alloy known as Mach's Magnalium, consisting of 69 parts aluminium, and 31 parts of magnesium. This material has a very high reflecting ability for ultra-violet radiation, reflecting substantially 80% of the visible radiation, and substantially 67% of the radiation of 250 m$\mu$. This material will thus reflect a high percentage of the wave-lengths here in use. Other materials will suggest themselves to the student of this specification as being well adapted to the present problem.

In some cases to be hereinafter described, the ultra-violet or ionizing beam will emerge from the window of the envelope in direction normal to the surface or the elements to receive and translate the force effects; in which cases the use of such an outside reflecting element is not necessary in order to produce the intended results. Embodiments including the features of the present invention, and wherein such direct transfer of the force effects to the receiving and translating surface are shown, will be described hereinafter.

The force effects of the ionizing wave-length beam brought to focus outside of the envelope may be used in various ways to produce a record, or to give an indication of the strength of the electronic beam within the envelope, either as an instantaneous indication corresponding to a particular location of that beam during a scan, or as a continuing indication of the beam's strength during the scan. In the various embodiments herein particularly illustrated and to be described briefly, the electron beam unit is used for producing a scan across the width of an area of a strip of material to which the varying beam strengths are to be recorded, or from which area the previously recorded strengths are to be sensed and translated, as in the case of a tape recording operation, followed by a translating operation based on the previously recorded strengths so recorded. Also, there are included in various of the figures, embodiments in which the recordings are produced as electro-static strengths carried by a strip of dielectric whereon the recording operation served to modulate the strength of electro-static charge retained on such strip of dielectric; and there are also disclosed means to sense and translate such recordings through modulation of a current strength or voltage according to the strengths of the retained electro-static charges. There are also disclosed embodiments wherein the recordings are made on a magnetically responsive strip, and also means whereby such recordings may thereafter be sensed and translated as modulations of current value, or as modulations of a voltage.

Before describing briefly the foregoing applications of units embodying features of the present invention, there will be disclosed means whereby the strengths of the beams or either of them, may be amplified, for the purpose of magnifying the variations of beam strength emitted to the sensing or recording element.

In FIGURES 28 and 31 there are shown the window end of the envelope as provided with an arcuate window 154, preferably of the lens type, in the lower wall or face of the envelope, instead of in the end wall, as shown in other figures. This window is transparent to ultra-violet wave lengths as previously disclosed herein. The inside surface of this window is provided with the phosphor coating, 155, for producing ultra-violet radiation under electron beam excitation, and conveniently such phosphor is shown as carried within a shallow arcuate groove to which the electron beam, or its amplification, is directed. It is now noted that such beam must suffer a right-angular change of direction to act on this phosphor coating.

Within the envelope there is provided the dynode 156, (see FIGURE 28), of arcuate form to receive the electron beam 157 and direct the secondary radiation upwardly at an angle to a second dynode 158, also of arcuate form, which second dynode directs its secondary radiation directly down to the phosphor surface as shown at 159. The two dynodes are provided with voltages or potentials $E_1$ and $E_2$, respectively, $E_1$ being of sufficient potential to produce a first magnification in the form of its secondary radiation (being a potential of, say 100 v. D.C. and $E_2$ being of sufficient potential to produce a second magnification in the form of its secondary radiation (being a potential of say, 200 v. D.C. ). With this arrangement the two dynodes should be of proper curvature and face contour, to ensure proper direction of their secondary radiations in the manner stated, through the scanning swing of the electron beam 157.

With this arrangement a two-fold benefit is secured; the intensity of the effect produced at the phosphor is greatly magnified, and there is avoided any need of reflection of the ultra-violet beam itself. In fact, a third benefit may also be mentioned, in the form of avoidance of the absorption loss necessarily attendant on the use of such a reflector.

The arrangement shown in FIGURE 30 is similar to that just described; but in the present case only a single dynode, 160 is provided, of curvature and form to direct its secondary radiation directly down to the phosphor deposit on the lower surface of the envelope. This arrangement will frequently be found to produce sufficient magnification of effect for the present purposes.

The arrangement shown in FIGURES 29 and 32 embodies a type of unit in which the electron beam does not produce a secondary wave-length of ionizing characteristics as is the case in the so far illustrated and described arrangements; but it does include the feature of magnification of the electron beam's effects by an amplifier included within the envelope. This embodiment is as follows:

A series of small, rather fine, electric conductors, 161, extend downwardly through the bottom face of the envelope to locations close to the element or elements to be influenced by the varying strengths of the electron beam, for production of the intended record; or, in case of a sensing operation, for sensing the strengths of previously recorded signals, and then producing proportional strengths in signals to be translated. In the embodiment shown in FIGURES 29 and 32, these "conductors" extend through the envelope floor and down close to the surface of the tape, whereon recordings are to be made corresponding to strengths of signals which modulate the strength of the electron beam (in case of a recording operation); or which tape carries modulated charges, either magnetic or electrostatic, previously recorded thereon. As the electron beam is caused to sweep laterally or horizontally, it contacts these "conductors" in succession, thus causing them to transmit currents of value proportional to the electron beam's strength at the instant of contacting each such conductor; or, subjecting such conductors to potentials proportional to the electron beam's strength at each conductor location. To this effect, the conductors are arranged around a circular arc conforming to the arc described by the end of the electron beam during scan, so that each conductor is in turn subjected to the direct effect of such beam. It is to be noted that when using the construction shown in FIGURES 29 and 32 all of such conductor wires are of equal length.

In the embodiment shown in these figures the primary electron beam does not itself contact such wires, but it acts through the interposition of the two dynodes 162 and 163 whose secondary radiations are of magnified intensity; the dynode 162 being legended as of potential $E_1$ and the dynode 163 being legended as of potential $E_2$. It is here noted that when using this embodiment there is no need of providing the phosphor surface as in the previous embodiments; and thus depletion of the emitting value of the phosphor is eliminated, and that very large amplifications of signals may be produced by the multiple dynode arrangement.

Provision has been made for lateral deflection of the electron beam within the envelope, to produce corresponding lateral scans of the ionizing wave-length beam emitted from the window, to thus enable production of successive scans with respect to a signal carrier of proper width to accommodate such scan requirements. Accordingly, in each of FIGURES 2, 3, 4, 5, 6, 8, 9, 12, 13, 35, 37, 39, 40 and 41 there is shown on the shank 112 of the electron tube the horizontal or lateral deflection yoke 114, of conventional form; such yoke serving, under proper energizations, to produce successive horizontal or lateral deflections or swings, under control of such a unit as the conventional saw-tooth generator. When the records are being produced on a travelling tape, each such lateral swing will produce a cross-scan of recording on such tape; and the successive scans will be separated a distance depending on the frequency of the scans as compared to the rate of tape travel. Such arrangments are fully disclosed in the parent application Serial No. 427,428, Letters Patent No. 2,976,354, issued March 21st, 1961.

In the absence of any deflection of the electron beam in direction at right-angles to such lateral swings (being in "vertical" direction as distinguished from horizontal direction of swing), it is evident that all scans of the electron beam will produce excitation of the responsive phosphor along the same narrow band of excitation. Since many millions of such scans will probably be made in a comparatively short time of use of the equipment, it is evident that the effective life of the phosphor may be correspondingly shortened. It is, therefore desirable to also make provision for a slight amount of vertical deflection of the beam, from time to time, to cause the phosphor surface to be excited at various linear areas during the life of the equipment, thus correspondingly extending the useful life of such equipment. Such vertical scans may be produced only to a very slight degree of line scan change, and such changes of position of line scan may be made either manually, by proper adjustments as may be needed, or automatically, after a pre-determined amount of use of the equipment. Accordingly, there is shown on each of the shanks 112 of the units shown in the above listed figures, a "vertical" deflection yoke, 112. By slightly increasing the energization of this yoke from time to time, leaving the energization unchanged during intervals between such changes, the linear area over which the scans will occur may be successively used, each such interval of use being of considerable duration; e.g. a week or a month.

It is noted that such successive changes in the linear scan locations need be small, probably of the order of 0.005 to 0.010 inch (5 to 10 mils), so that the width of the window area should be enough to accommodate a number of such successive adjustments of scanning position. It is also noted that when provision is made for such vertical scan adjustments, the form of the lens at the window location should be such that beams emitted from such several scanning locations will always be brought to substantial focus at the intended planar location outside of the envelope, and for the full scanning distance. The lens showings in various figures are schematic in form; since design of proper lens forms to meet the requirements as specified at various portions of this specification is largely a matter of engineering or optical design.

The ionizing wave-length beam emitted from the window are to be used for producing recordings or for sensing recording previously made, on such a carrier as a tape. When such recordings are produced as electro-static charges of varying strengths (potentials) carried by a suitable dielectric sheet or tape, the ionizing wave-length beam emitted from the window and brought to substantial focus at the surface of such carrier, may be used for modulating the charge of electricity carried by that tape, by first electrifying the tape surface to a full pre-determined potential, and then producing discharges from such potential at successive elemental areas scanned by the ionizing wave-length beam; the discharge at each such area being proportional to the strength of the beam impacting such area; thus leaving on the surface of the carrier a remainder electro-static charge proportional to the difference between the original charge, and the beam strength to which such elemental area was subjected. Thus a recording may be electro-statically produced on the carrier by direct action of the ionizing wave-length beam. When such a previously recorded series of signals is to be sensed during or for an interpreting operation, such ionizing wave-length beam may again be scanned over the recorded electro-static charges for production of response signals proportional in strength to the strengths of the electrostatic charges remaining on the carrier. In such case, however, it is convenient to locate a detector plate in close association to the surface of the carrier opposite to that surface thus scanned, so that such detector plate will have induced in it a potential of opposite polarity to the potential of the charge carried by the carrier at such location; and of strength proportional to the strength of the electrostatic charge remaining on the carrier at the instantaneous point of impact of the ionizing wave-length beam. Such detector plates are shown on various of the figures, as follows: at 127, FIGURES 5 and 6 there is shown such a detector plate beneath the scanning line; and such detector plates are also shown in said figures at 128, for detecting sound track signals, and at 129 for detecting synchronizing signals.

When the ionizing wave-length beam emitted from the window and brought to focus is to be used for producing recordings in the form of varying magnetic strengths of magnetizable material carried by the carrier, or for sensing magnetic recordings previously produced on such carrier, it is convenient to provide means to convert the strength of the ionizing wave-length beam into a current or potential of corresponding strength, at a location close to the surface of the magnetizable carrier, to thus facilitate translation of the strength of the ionizing wave-length beam into strength of magnetization to be used for producing the record of the signal on the tape; or, in the operation of sensing previously recorded signals being carried by that tape as variations of magnetization of such surface, it is desirable to provide means to respond to the magnetic strength of such previously recorded signals, only at instantaneous locations along the scan at which locations the ionizing wave-length beam is operative, such responses also being of strengths corresponding to the strengths of the magnetic recordings at such locations. Such provision is herein disclosed as follows:

Two (or three) conductors are supported rigidly with respect to the window of the envelope, and at slight separation from each other, to provide a narrow gap between such conductors. These conductors are of curvature or shape such that such narrow gap exactly conforms to the path of scan followed by the ionizing wave-length beam emitted from the window and such that said gap lies substantially in the plane at which the ionizing wave-length beam comes to focus. Thus, as the electron beam is caused to execute its scan, the ionizing wave-length beam and point of focus execute a like scan, travelling along the narrow gap from end to end in the direction of scan, and ionizing the air at a small area or point between the conductors, so that such small area becomes electrically conducting to a degree proportional to the strength of the ionizing wave-length beam at the location of such small area. By providing means to maintain such conductors at fixed potentials, one higher than the other, a current will flow between the conductors at the location of such ionization, and of strength proportional to the conductivity of the ionized area (location of the beam's focus), and thus proportional to the strength of the modulated electron beam itself. Thus, during each scan the strength of such current will be modulated during the scan proportional to the modulated strength of the electron beam itself. Such current will flow lengthwise of the carrier— that is, parallel to the direction of carrier travel—producing north and south poles of magnetization at the surface of the carrier, and thus producing the desired recording magnetically.

Reference to FIGURE 17 shows, schematically, such an arrangement for producing the recording. There the conductors are shown at 133 and 134, and the air gap is shown at 135. The simple circuit there shown includes the current source of constant potential in the form of the battery 140, connected to the conductors by the lines 138 and 139, and maintaining the constant potential E across the air-gap. Other arrangements will suggest themselves to the student of this specification, for translating the strength of the ionizing wave-length beam into magnetically recorded elemental areas of the carrier.

In FIGURES 18 and 19 there are shown, schematically, simple circuit arrangement by which previously recorded magnetic recordings or signals may be sensed and translated by use of the ionizing wave-length beam, such sensings and translations being electrically produced. In this connection, it is first noted that as long as there exists an ionized elemental area of air between the two conductors, the supply of potential difference between such conductors will cause a current flow between them. Also, since the electron beam is being deflected at high rate, with corresponding high rate of travel of the ionized elemental area, along the gap, such travelling elemental area of ionized air constitutes a conducting element, extending between the conductors at the sides of the air-gap, and travelling along such gap at that same high rate of travel. Thus, if during such travel such ionized air conductor crosses magnetic fields carried by the carrier in the form of previously made recordings, there must be induced in such travelling conductor E.M.F.'s of magnitude proportional to the rate of change of the flux bodies crosed during such travel. Such flux bodies are produced by the previously made magnetic recordings. Thus, there will be induced in the travelling conductor E.M.F.'s proportional to the strengths of such previously made magnetic recordings. Due to the very high rate of travel of such ionized elemental area of air between the stationary conductors, it is evident that even small magnitudes of magnetic recordings will produce measurable E.M.F.'s, as differences of potential between the stationary conductors 133 and 134. For example, when producing scans at the rate of 15,750/sec., as in the case of producing a recording of a televised program wherein there are that many scans per second, and assuming a length of scan of 2 inches, the rate of scanning travel is 31,500 inches per second, or 2625 ft. sec.

In the schematic showing of FIGURE 18, one terminal of the battery or other source of constant potential, 143, connects by the line 142 with one of the conductors 134; the other battery terminal being shown as grounded. The other conductor 113 connects to the sense recording or interpreting unit, the free end of such unit being grounded, so that such unit is subjected to the potential between the line 141 and ground. That potential is equal to the battery potential E plus the induced potential $e$ inducted by the travel of the ionized area of the air gap across the flux carried by the carrier. Thus the sensing or translating unit is subjected to the potential of E plus $e$, wherein $e$ is a variable.

In the schematic showing of FIGURE 19, both of the battery terminals are connected to the conductors 133 and 134, the one battery terminal connecting to the conductor 133 by the line 141$^a$, and the other battery terminal connecting to the conductor 134 by the line 142$^a$, in which line is included the resistor 144 of value R. It is here noted that in each of the showings of FIGURES 18 and 19 the electron beam is unmodulated and of constant strength, so that the conductivity of the elemental area of the air-gap at the location of the ionizing beam remains constant. Such being the case, in the arrangement of FIGURE 19, as long as the strength of the ionizing beam is constant the conductivity across the air-gap remains constant, assuming that there is present no induced E.M.F. due to cutting flux. Thus the current flow through the system between the battery terminals will remain constant, with corresponding constant drop across the resistance R. Thus the potential of the point 145 (FIGURE 19) will remain constant under such conditions. However, when cutting across previously recorded bodies of flux, potentials will be induced between the conductors 133 and 134, proportional to such induced values; and such induced potentials will be algebraically additive to the potential through the system. Thus, the current will vary accordingly, with corresponding variation of the drop across the resistor R; and, since the line 142ᵃ connects to the stationary potential of one end of the battery, the potential at the point 145 will also vary proportionately to the variation of induced E.M.F. A suitable sensing or translating unit may be connected across the potential between such point 145 and one end of the battery, such as the grounded end shown in FIGURE 19.

In order to reduce the effects of air-gaps in the magnetic path as much as possible, it is preferable that the conductors 133 and 134 ride lightly on the surface of the magnetic carrier, so as to bring the proximate edges of the conductors 133 and 134 close to such carrier surface. To enhance this benefit the proximate edges of such conductors may be beveled as shown in FIGURES 28, 30 and 34, bringing such proximate edges to a somewhat sharpened form as shown. It is also desirable to hold such conductors rigidly together at desired spacing. To this end such conductors may be connected together at proper spacing by the insulating clips 136 and 137 (FIGURE 23), which clips may be connected to a stationary part, preferably to the proximate end of the envelope element, so as to retain the air-gap firmly in exact position with respect to the envelope window.

As indicated in FIGURE 23 the lower surfaces of the conductors 133 and 134 may be surfaced with enamel or the like, to enable the conductors to ride smoothly on the surface of the carrier, while assuring very close positioning of the proximate edges of the conductors, to the surface of the carrier.

For purposes of illustration, only, there are shown in various of the figures various applications of the deflectable beam scanning unit of the present application, to recording and sensing and translating operations of frequent occurrence. The following comments are pertinent respecting these several showings:

In FIGURES 1, 2 and 3, a unit of the present application is shown in place with respect to a tape of dielectric material designed and constituted to carry electro-static charges for recording and later sensing operations. In this case the envelope of the deflectable beam element lies parallel to the surface receiving the recorded signals; and a reflector is provided in position with respect to the end window through which the ionizing wave-length beam emerges, for reflecting such emerged beam down towards the carrier surface and at right-angles thereto. In this case also, provision is made for sealing the electrets in place after the modulating operation has been performed by the deflectable beam scanning unit.

In FIGURES 4, 5 and 6, there is shown an arrangement embodying the deflectable beam scanning unit of the present application, for scanning and sensing the previously recorded electro-static signals, and making provision for interpreting the same. This showing includes the detector plate in place opposite to the sensing unit, for receiving signals proportional in strength, to the recorded signals.

In FIGURES 7, 8, 9 and 10, there is shown a unit of the present application, as it may be used for the production of cross-scanned signals of magnetic strengths carried by a conventional or other magnetic recording tape. In this case, too, the deflectable beam scanning unit is of form to lie parallel to the tape carrier, with emergence of the ionized wavelength beam from the end of such unit, and provision of a reflector external to the envelope, for reflecting the ionized wave-length beam down towards the carrier surface and at right-angles thereto. The two conductors 133 and 134 which provide the the narrow air-gap between them, are also shown, particularly in FIGURES 9 and 10.

In FIGURES 11, 12, 13 and 14, there are shown a sensing and translating arrangement for sensing the previously recorded magnetic values corresponding to recorded signals; such sensing arrangement including the two conductors 133 and 134.

FIGURES 15 and 16 indicate, schematically, how signals corresponding to radiated televised color programs may be recorded by the use of the cross-scanning arrangement, for later sensing and interpretation to supply signals for transmission to a television receiver, or for broadcasting operation. Thus, in FIGURE 15 the recorded signals correspond, schematically, to radiated signals on the basis of the "dot" system of three color dot arrays. In FIGURE 16 the recorded signals correspond to full line color emitted signals, thus also received and recorded as full color scan recordings.

The showings of FIGURES 17, 18, 19, 20 and 21 have bee previously discussed.

FIGURES 22, 23, 24, 25, 26 and 27 show details of tape type carriers having recording surfaces of magnetizable material. The showings of FIGURES 24, 25, 26 and 27 are of a tape carrier provided with slight upstanding ridges, curved on curvatures the same as the scans to be recorded thereon, and at spacings equal to the travel distance of the tape between the beginnings of successive cross scans.

The showings of FIGURES 28, 29, 30, 31, 32, 33 and 34 relate to features previously described; but it is here proper to describe in detail the showing of FIGURES 33 and 34. In this case there is shown a modified embodiment of the two-conductor air-gap arrangement previously discussed in detail. In the present case the two conductors 146 and 147 provide an air-gap between them; and a third conductor 149 is located centrally of such air-gap 148, thus in effect dividing the air-gap into two parallel strips or sub-gaps. The two outside conductors 146 and 147 are electrically connected together as shown by the line 150, and constitute one terminal of the unit. The other terminal is provided by the conductor 149. The ionizing wavelength beam strikes both of the air-gaps, thus ionizing both of them and rendering them conductive, both at substantially the same degree of conductivity at all points along the line of scan. Accordingly, if the connector 150 be electrified positive for example, current flow will be from such conductor to both of the outside conductors 146 and 147, flowing in opposite directions to them. Thus the magnetizing effect produced at the surface of the magnetizable carrier, will be bi-polar, instead of uni-polar as in the previously described embodiments. Thus north and south poles will be produced at all locations along the line of scan, with corresponding benefits in the production of the recorded signals. A like benefit will accrue when such recorded signals are afterward sensed and interpreted.

It is noted that in each of the previously described embodiments the window end of the envelope is formed on a circular arc concentric with the point of electron beam deflection so that the focal length of that beam need not be changed during each scan in order to bring such beam to continued focus at the phosphor surface which is to be excited. In FIGURES 35, 36, 37 and 38 there is shown another embodiment of the deflectable beam scanning unit, in which embodiment the window end of the envelope is straight or flat, the scanning unit being then retained in position at right-angles to the surface of the carrier. The flat nature of the envelope's end thus enables close relation of the window to the carrier surface. However, in order to gain most advantage in the form of producing maximum effect of the electron beam at the phosphor surface, with this arrangement the focal length of the electron beam should be varied during each scan, in manner effective to retain such beam at focus with varying length of the beam. Various arrangements to produce such effects are known in the electronic arts.

The embodiment shown in FIGURES 39, 40, 41 and 42 is similar to that shown in FIGURES 35, 36, 37 and 38, in the sense that in both that embodiment and that of FIGURES 39, 40, 41 and 42 the deflectable beam scanning unit is retained at right-angles to the surface of the carrier. However, in the present embodiment of FIGURES 39, 40, 41 and 42 provision is made, by the use of suitably formed rollers, for bringing the cross section of the tape into curvature the same as that of the circular arc on which the window is formed, being concentric with the center of beam deflection. Thus, in the present arrangement the focal length of the beam remains unchanged during cross-scans, and avoiding the need of correction of such focal length during each scanning operation.

We claim:

1. A gas-tight envelope, a target within said envelope constituted to emit an ultra-violet beam when said target is excited by impact of an electron beam against said target, means to produce and emit an electron beam against said target within the envelope, said envelope comprising material transparent to said ultra-violet beam at a location in position to transmit said ultra-violet beam from the target to the exterior of the envelope, and means exterior to the envelope in the path of said ultra-violet beam, constituted to receive said beam and produce a force proportional to the strength of said beam, together with means to produce a record of the strength of the force which is proportional to the strength of said beam.

2. The combination as defined in claim 1, wherein the target is in proximity to the envelope location which is transparent to said ultra-violet beam.

3. The combination as defined in claim 1, wherein the envelope location which is transparent to said ultra-violet beam comprises a window in said envelope.

4. The combination as defined in claim 3, wherein said window is of lens form constituted to bring the ultra-violet beam to focus outside the envelope.

5. The combination as defined in claim 4, wherein the means which is constituted to receive said ultra-violet beam and produce a force proportional to the strength of said beam, is located at the position of focus of said ultra-violet beam.

6. A gas-tight envelope, a target within said envelope elongated in direction and contour corresponding to the sweep of an electron beam, means to produce and emit an electron beam against said target within the envelope, and means to produce a lateral sweep scan of the electron beam in the direction of the elongation of the target, the target being in close proximity to the inner surface of the envelope and constituted to emit an ultra-violet beam when excited by the electron beam, the material of the envelope at the location of the target being transparent to said ultra-violet beam and said ultra-violet beam being delivered from said transparent envelope location to the exterior of the envelope as a beam, said ultra-violet beam exterior to the envelope executing a sweep scan corresponding to the sweep scan of the electron beam within the envelope, wherein the envelope at the location of the target of which the material is transparent to said ultra-violet beam, is of lens formation and constituted to bring the ultra-violet beam to focus outside of the envelope, along a line of sweep scan exterior to the envelope and corresponding to the sweep scan of the electron beam within the envelope.

7. The combination as defined in claim 6, together with means exterior to the envelope in the path of sweep scan of the focus of the ultra-violet beam, constituted to produce a force proportional to the strength of the ultra-violet beam at all points along said path, together with means to produce a record of the strength of said force which is proportional to the strength of said beam.

8. A gas-tight envelope, means to produce and emit an electron beam within the envelope, means to produce a lateral sweep scan of the electron beam in a predetermined path of scan, a series of elemental target areas proximate to the inner surface of a wall of the envelope, said target areas lying in succession along the path of beam scan and the electron beam contacting said elemental areas in succession during scan of the electron beam, primary force transmitting means between the elemental areas and the exterior of the envelope constituted to transmit to such envelope exterior successive forces in a path of delivery of said forces to the exterior of the envelope corresponding to the path of beam scan of the elemental areas within the envelope and corresponding to the contacting of the electron beam with the successive elemental areas, and of force values proportional to the strength of the electron beam in contact with each such elemental area, means exterior to the envelope in the path of delivery of said primary force values successively responsive to said force values, and means within the envelope and located in the path of the electron beam between the means which produces said beam and the elemental target areas, constituted to amplify the strength of the electron beam at a point between the means which produces and emits said beam, and the elemental targets, wherein the elemental areas comprise proximate elemental areas of a coating of material constituted to emit ultra-violet when said elemental areas are excited by the electron beam, and wherein the primary force transmitting means between the elemental areas and the exterior of the envelope comprises envelope material to which the ultra-violet wave lengths are transparent.

9. A gas-tight envelope, means to produce and emit an electron beam within the envelope, means to produce a lateral sweep scan of the electron beam in a predetermined path of scan, a series of elemental target areas proximate to the inner surface of a wall of the envelope, said target areas lying in succession along the path of beam scan and the electron beam contacting said elemental areas in succession during scan of the electron beam, primary force transmitting means between the elemental areas and the exterior of the envelope constituted to transmit to such envelope exterior successive forces in a path of delivery of said forces to the exterior of the envelope corresponding to the path of beam scan of the elemental areas within the envelope and corresponding to the contacting of the electron beam with the successive elemental areas, and of force values proportional to the strength of the electron beam in contact with each such elemental area, means exterior to the envelope in the path of delivery of said primary force values successively responsive to said force values, and means within the envelope and located in the path of the electron beam between the means which produces said beam and the elemental target areas constituted to amplify the strength of the electron beam at a point between the means which produces and emits said beam and the elemental targets; wherein the primary force transmitting means comprises a series of conductors extending through the envelope and having their inner ends at the locations of the elemental target areas and successively contacted by the electron beam during each scan, said inner ends constituting the elemental areas.

10. A gas-tight envelope, a target within said envelope elongated in direction and contour corresponding to the sweep of an electron beam, means to produce and emit an electron beam against said target within the envelope, and means to produce a lateral sweep scan of the electron beam in the direction of the elongation of the target, the target being in close proximity to the inner surface of the envelope and constituted to emit a beam of wavelengths within the ionizing range when excited by the electron beam, the material of the envelope at the location of the target being transparent to said ionizing wave-lengths and said ionizing wave-lengths being delivered from said transparent envelope location to the exterior of the envelope as a beam, said ionizing wave-length beam exterior to the envelope executing a sweep scan corresponding to the sweep scan of the electron beam within the envelope, wherein the envelope at the location of the target of which the material is transparent to said ionizing wave-lengths, is of lens formation and constituted to bring the ionizing wave-lengths beam to focus outside of the envelope, along a line of sweep scan exterior to the envelope and corresponding to the sweep scan of the electron beam within the envelope, together with means exterior to the envelope in the path of sweep scan of the focus of the ionizing wave-length beam, constituted to produce a force proportional to the strength of the ionizing wave-length beam at all points along said path, together with means to produce a record of the strength of said force which is proportional to the strength of said beam; wherein said means to produce a force proportional to the strength of the ionizing wave-length beam, comprises a pair of conductors extending parallel to each other in the direction of sweep scan and separated from each other to produce between them an elongated narrow air-gap registering with said path of sweep scan.

11. The combination as defined in claim 10, together with electrical conductors in connection with said pair of separated conductors.

12. The combination as defined in claim 10, together with a third conductor extending lengthwise of the central portion of said air-gap and dividing said air-gap into parallel sub-gaps.

13. The combination as defined in claim 12, together with a connection between the first mentioned pair of conductors, an electrical connection to said connection aforesaid, and an electrical connection to the third conductor.

References Cited by the Examiner
UNITED STATES PATENTS

| | | | |
|---|---|---|---|
| 2,095,839 | 10/1937 | Sheppard et al. | 250—65 |
| 2,227,092 | 12/1940 | Klemperer | 313—68 |
| 2,283,383 | 5/1942 | McNaney | 346—74 |
| 2,291,476 | 7/1942 | Kernkamp | 346—74 |
| 2,569,654 | 10/1951 | Cage | 313—92 |
| 2,770,749 | 11/1956 | Bril et al. | 313—92 |

JOHN W. HUCKERT, *Primary Examiner.*

RALPH G. NILSON, GEORGE N. WESTBY, DAVID J. GALVIN, *Examiners.*